(12) United States Patent
Meylan et al.

(10) Patent No.: US 8,665,804 B2
(45) Date of Patent: Mar. 4, 2014

(54) FILTERING SEMI-PERSISTENT SCHEDULING FALSE ALARMS

(75) Inventors: Arnaud Meylan, Bois-Colombes (FR); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 665 days.

(21) Appl. No.: 12/400,758

(22) Filed: Mar. 9, 2009

(65) Prior Publication Data

US 2009/0257385 A1 Oct. 15, 2009

Related U.S. Application Data

(60) Provisional application No. 61/038,037, filed on Mar. 19, 2008.

(51) Int. Cl.
*H04W 4/00* (2009.01)
*H04W 72/00* (2009.01)
*H04W 72/04* (2009.01)
*H04W 28/04* (2009.01)

(52) U.S. Cl.
CPC .............. *H04W 72/04* (2013.01); *H04W 28/04* (2013.01)
USPC ......................... 370/329; 714/748; 455/452.2

(58) Field of Classification Search
USPC ................ 370/329; 714/748; 455/451, 452.1, 455/452.2
See application file for complete search history.

(56) References Cited

U.S. PATENT DOCUMENTS

| 5,784,362 | A | 7/1998 | Turina | |
|---|---|---|---|---|
| 7,127,654 | B2 | 10/2006 | Jalali et al. | |
| 7,551,625 | B2 | 6/2009 | Ahn et al. | |
| 2009/0003282 | A1* | 1/2009 | Meylan et al. | 370/331 |
| 2009/0197610 | A1* | 8/2009 | Chun et al. | 455/450 |
| 2009/0197630 | A1* | 8/2009 | Ahn et al. | 455/522 |
| 2009/0207797 | A1* | 8/2009 | Shen et al. | 370/329 |
| 2009/0232309 | A1* | 9/2009 | Montojo et al. | 380/270 |
| 2009/0327828 | A1* | 12/2009 | Ojala et al. | 714/749 |
| 2010/0035621 | A1* | 2/2010 | Chun et al. | 455/450 |
| 2010/0208667 | A1* | 8/2010 | Chun et al. | 370/329 |

FOREIGN PATENT DOCUMENTS

| CN | 1501646 A | 6/2004 |
|---|---|---|
| CN | 1943174 A | 4/2007 |
| EP | 1748593 A1 | 1/2007 |
| JP | 2007531453 A | 11/2007 |

(Continued)

OTHER PUBLICATIONS

Motorola, "NDI vs RV for E-UTRA Uplink", Jan. 14-18, 2008, 3GPP, TSG-RAN WG1#51bis (R1-080439), pp. 1 and 2.*

(Continued)

*Primary Examiner* — Paul H Masur
(74) *Attorney, Agent, or Firm* — Larry J. Moskowitz

(57) ABSTRACT

A scheduled data communication system of an access node and terminal supports recurring communications of small data amounts such as Voice over IP (VoIP). In order to make error checking more robust in a random access response (RAR), such as for semi-persistent scheduling (SPS) for VoIP, a portion of a grant or assignment payload has a constraint imposed that can be verified as a condition precedent to determining a valid grant or assignment rather than only relying upon a validity check field, such as a cyclic redundancy check (CRC). Thereby, incorrect validation of a grant or assignment is avoided for dynamic scheduling or for semi-persistent scheduling, the latter causing a persistent error.

89 Claims, 14 Drawing Sheets

(56) References Cited

FOREIGN PATENT DOCUMENTS

| KR | 20070108250 A | 11/2007 |
|---|---|---|
| RU | 2161873 C2 | 1/2001 |
| RU | 2295833 | 3/2007 |
| TW | 200733673 | 9/2007 |
| TW | 200746767 | 12/2007 |
| WO | 2005094189 A2 | 10/2005 |
| WO | WO2008024890 | 2/2008 |

OTHER PUBLICATIONS

Motorola, "PDCCH Formats (A) for Scheduling Grants", Nov. 5-9, 2007, 3GPP, TSG RAN1 #51 (R1-074587), pp. 1-4.*

Dajie Jiang et al: "Principle and Performance of Semi-Persistent Scheduling for VoIP in LTE System" Sep. 21, 2007, Wireless Communications, Networking and Mobile Computing, 2007. WICOM 2007. International Conference on, IEEE, Piscataway, NJ, USA, pp. 2861-2864 , XP031261882 ISBN: 978-1-4244-1311-9 the whole document.

International Search Report & Written Opinion—PCT/US2009/037669, International Search Authority—European Patent Office—Aug. 4, 2009.

NTT Docomo et al: "Persistent Scheduling in E-UTRA" Jan. 10, 2007, 3GPP Draft; RI-070098 Persistent Scheduling, 3rd Generation Partnership Project (3GPP), Mobile Competence Centre ; 650, Route Des Lucioles ; F-06921 Sophia-Antipolis Cedex ; France , XP050104150 the whole document.

Chairman: "Draft User Plan session report", UTRA/UTRAN Long Term Evolution Stage 3, TSG-RAN WG2 Meeting #61, R2-081220, Sorrento, Italy, Feb. 11-15, 2008.

Ericsson et al., "Control of semi persistent scheduling", TSG-RAN WG2 Meeting #61, R2-080765, Sorrento, Italy, Feb. 11-15, 2008.

"3GPP TS 36.212; 3rd Generation Partnership Project; Technical Specification Group Radio Access Network; Evolved Universal Terrestrial Radio Access (E-UTRA); Multiplexing and channel coding (Release 8)", V8.1.0 (Nov. 2007) 5.3.3.

"3GPP TS 36.300 V8.3.0 (Dec. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Dec. 2007, pp. 1-121.

Taiwan Search Report—TW098108989—TIPO—Nov. 2, 2012.

* cited by examiner

FILTERING SEMI-PERSISTENT SCHEDULING FALSE ALARMS

CLAIM OF PRIORITY UNDER 35 U.S.C. §119

The present Application for Patent claims priority to Provisional Application No. 61/038,037 entitled "A Method and Apparatus for Using Dual Layer of Error Checking to Reduce False CRC Matching" filed Mar. 19, 2008, assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for semi-persistent scheduling on an uplink channel.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Semi-persistent scheduling (SPS) is a set of techniques for efficiently assigning resources for periodic traffic in a wireless communication system to support resource assignment with as little overhead as possible in order to improve system capacity.

Current communication system uses a 16-bit cyclic redundancy check (CRC) on all physical downlink control channel (PDCCH) formats. Several formats exist for PDCCH, including downlink (DL), DL compact, UL, and power control. In addition various groupings can be done. As a result the UE must perform about 40 blind decodes per PDCCH per subframe. After decoding is done, UE computes a CRC (X-CRC) over the decoded bits. The X-CRC is checked against the CRC indicated in the PDCCH. If there is a match, the PDCCH is deemed for the UE, its content is interpreted and appropriate actions are performed, i.e. either a transmission or a reception occurs.

A false alarm occurs when the X-CRC matches with the CRC, however, that PDCCH is not meant for that UE. The PDCCH payload can be considered to largely contain random bits in this instance yet the UE performs actions as indicated. Assuming PDCCH bits are random, a false alarm occurs on average every $2^{16}$ times the CRC check is done. In the worst case the UE performs 40 blind decodes per subframe, and there are 1000 subframes per second. In that case a false alarm will occur for that UE every $2^{16}/(40*1000)=1.6$ seconds.

When dynamic scheduling is used, the consequence of false alarms is limited to one set of HARQ (Hybrid Automatic-Repeat-Request) transmission and possible subsequent retransmissions. Therefore the consequences are limited.

However when a UE is configured for semi-persistent scheduling (SPS), the consequences can be more serious, especially on the uplink. The evolved base node (eNB) uses a PDCCH with a SPS indication to start SPS. The grant indicated in PDCCH will then repeat every serving interval until revoked. A typical serving interval is 20 ms for VoIP.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with encoding by a base node such that a user equipment (UE) can perform a multiple error checking to reduce false alarms by passing CRC (cyclic redundancy check) even if data was corrupted when processing data on physical downlink control channel (PDCCH). The PDCCH can be used to indicate a grant to the UE. In this description, a grant may be for reception on downlink channel or transmission on uplink channel.

In one aspect, a method is provided for receiving a scheduling indication. A grant or assignment is detected on a control channel. A constraint verified on a portion of a payload carried on the control channel indicative of valid grant or assignment as a condition for determining payload validity. Transmitting or receiving is performed in accordance with the payload on the control channel in response to a determination that the constraint on the portion of a payload is verified.

In another aspect, at least one processor is provided for receiving a scheduling indication. A first module detects a grant or assignment on a control channel. A second module verifies a constraint on a portion of a payload carried on the control channel indicative of valid grant or assignment as a condition for determining payload validity. A third module transmits or receives in accordance with the payload on the control channel in response to a determination that the constraint on the portion of a payload is verified.

In an additional aspect, a computer program product is provided for receiving a scheduling indication. A computer-readable storage medium comprises a first set of codes for causing a computer to detect a grant or assignment on a control channel. A second set of codes causes the computer to verify a constraint on a portion of a payload carried on the control channel indicative of valid grant or assignment as a condition for determining payload validity. A third set of codes causes the computer to transmit or receiving in accordance with the payload on the control channel in response to a determination that the constraint on the portion of a payload is verified.

In another additional aspect, an apparatus is provided for receiving a scheduling indication. Means are provided for detecting a grant or assignment on a control channel. Means are provided for verifying a constraint on a portion of a payload carried on the control channel indicative of valid grant or assignment as a condition for determining payload validity. Means are provided for transmitting or receiving in accordance with the payload on the control channel in response to a determination that the constraint on the portion of a payload is verified.

In a further aspect, an apparatus is provided for receiving a scheduling indication. A receiver detects a grant or assignment on a control channel. A computing platform verifies a constraint on a portion of a payload carried on the control channel indicative of valid grant or assignment as a condition for determining payload validity. A transmitter and the receiver transmits or receives in accordance with the payload on the control channel in response to a determination that the constraint on the portion of a payload is verified.

In yet one aspect, a method is provided for transmitting a scheduling indication. A control channel payload is encoded for indicating a grant or assignment. A constraint is imposed on a portion of a payload carried on the control channel indicative of valid grant or assignment as a condition for determining payload validity. A grant or assignment comprising the payload is transmitted on a control channel.

In yet another aspect, at least one processor is provided for transmitting a scheduling indication. A first module encodes a control channel payload for indicating a grant or assignment. A second module imposes a constraint on a portion of a payload carried on the control channel indicative of valid grant or assignment as a condition for determining payload validity. A third module transmits a grant or assignment comprising the payload on a control channel.

In yet an additional aspect, a computer program product is provided for transmitting a scheduling indication. A computer-readable storage medium comprises a set first of codes for causing a computer to encode a control channel payload for indicating a grant or assignment. A second set of codes causes the computer to impose a constraint on a portion of a payload carried on the control channel indicative of valid grant or assignment as a condition for determining payload validity. A third set of codes causes the computer to transmit a grant or assignment comprising the payload on a control channel.

In yet another additional aspect, an apparatus is provided for transmitting a scheduling indication. Means are provided for encoding a control channel payload for indicating a grant or assignment. Means are provided for imposing a constraint on a portion of a payload carried on the control channel indicative of valid grant or assignment as a condition for determining payload validity. Means are provided for transmitting a grant or assignment comprising the payload on a control channel.

In yet a further aspect, an apparatus is provided for transmitting a scheduling indication. A computing platform encodes a control channel payload for indicating a grant or assignment. The computing platform imposes a constraint on a portion of a payload carried on the control channel indicative of valid grant or assignment as a condition for determining payload validity. A transmitter transmits a grant or assignment comprising the payload on a control channel.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
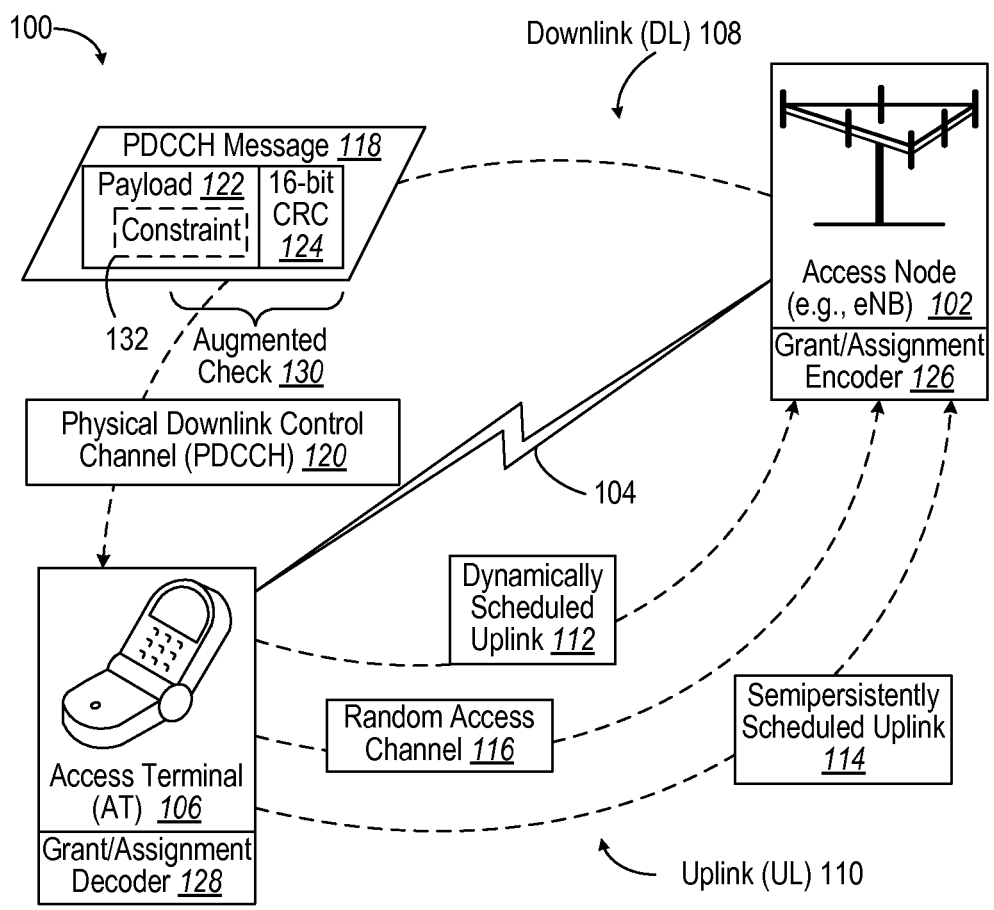
FIG. 1 depicts a block diagram of a communication system employing a augmented cyclic redundancy checking ("virtual" CRC)

A scheduled data communication system of an access node and terminal supports recurring communications of small data amounts such as Voice over IP (VoIP). In order to make error checking more robust in a random access response (RAR), such as for semi-persistent scheduling (SPS) for VoIP, a portion of a grant or assignment payload has a constraint imposed that can be verified as a condition precedent to determining a valid grant or assignment rather than only relying upon a validity check field, such as a cyclic redundancy check (CRC). Thereby, incorrect validation of a grant or assignment is avoided for dynamic scheduling or for semi-persistent scheduling, the latter causing a persistent error. Because a validation is performed on a portion of a payload, the constrained portion of payload may also be referred to as 'virtual CRC'.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Referring initially to FIG. 1, a communication system 100 of an access node (AN) 102 communicates via an over-the-air (OTA) link 104 with an access terminal (AT) 106, also referred herein as user equipment (UE), in a fully scheduled manner on both a downlink (DL) 108 and an uplink (UL) 110 for dynamic scheduling, the latter depicted in particular as a dynamically scheduled uplink 112. The AT 106 is advantageously capable of transmitting on the UL 110 with semi-persistent scheduling (SPS) on an SPS uplink 114. In anticipation of a talk spurt for VoIP communication (e.g., an SPS request on a random access channel (RACH) 116), for instance, the AN 102 can present an indication for SPS (e.g., DL assignment, UL grant) as part of a message 118 on a physical downlink control channel (PDCCH) 120. The message 118 comprises a PDCCH payload 122 and a check field, depicted as a 16-bit CRC (cyclic redundancy check) 124.

Some types of communication lend themselves to semi-persistent scheduling (SPS), such as VoIP. The recurring nature but relatively small amounts of data transmitted warrant a relaxation in the overhead of fully scheduling the uplink transmissions. Advantageously the AN 102 utilizes a grant/assignment encoder 126 and the AT 106 utilizes a grant/assignment decoder 128 that incorporate a more robust check encoding/decoding that used for conventional dynamic or SPS scheduling. In particular, an augmented check 130 is achieved by applying a constraint 132 to the PDCCH payload 122 in conjunction with or as a condition precedent to determining validity based upon the CRC 124. Thereby, the probability of a false positive validity determination can be substantially reduced.

It should be appreciated with the benefit of the present disclosure that the exemplary versions described herein utilize a grant or assignment on a downlink control channel that has particular advantages on an uplink channel and for semi-persistent scheduling. However, applications consistent with aspects of the present innovation can be applied to validity checking for a message received on an uplink and also for dynamic scheduling as well.

Figure 2:
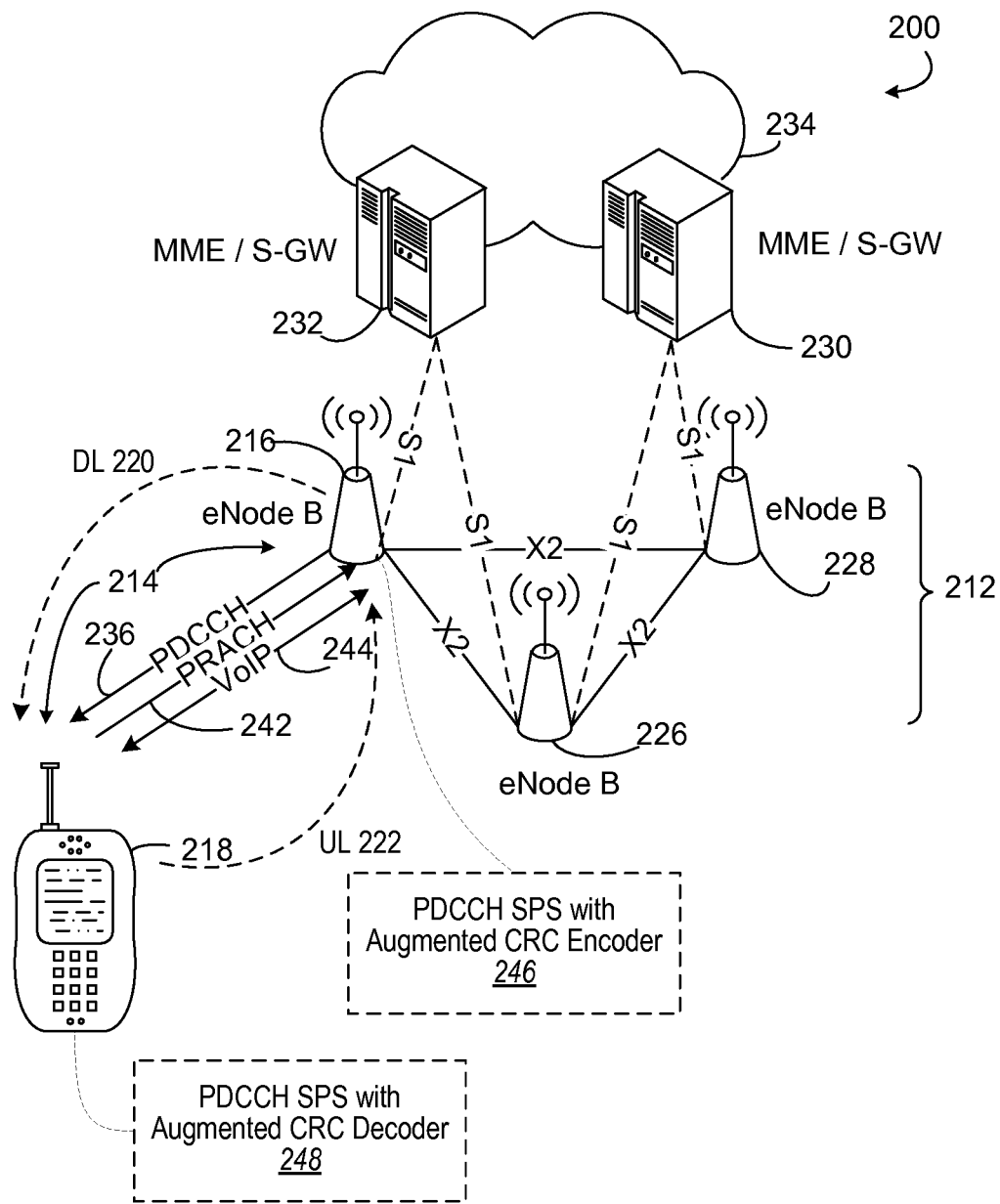
FIG. 2 depicts a block diagram of a communication system including an evolved Universal Mobile Telecommunications System (UMTS) Terrestrial Radio Access Network (E-UTRAN) that incorporates an augmented cyclic redundancy checking for random access responses capability between at last one radio access network user equipment.

In FIG. 2, in one aspect, a communication system 200 includes an evolved Universal Mobile Telecommunications System (UMTS) Terrestrial Radio Access Network (E-UT- RAN) 212 that incorporates an augmented cyclic redundancy checking for random access responses capability 214 between at last one radio access network (RAN), depicted as an evolved base node (eNode B) 216 and a user equipment (UE) device 218. In the illustrative version, the UE device 218 is being dynamically scheduled via downlink (DL) 220 for communication on an uplink (UL) 222. The E-TRAN 212 also includes eNode Bs 226, 228.

The eNode Bs 216, 226, 228 provide an UMTS Terrestrial Radio Access (E-UTRA) user plane and control plane (RRC) protocol terminations towards the UEs 218. The user plane can comprise of 3GPP (3rd Generation Partnership Project) Packet Data Convergence Protocol (PDCP), radio link control (RLC), medium access control (MAC) and physical layer control (PHY). The eNode Bs 216, 226, 228 are interconnected with each other by means of X2 interface ("X2"). The eNode Bs 216, 226, 228 are also connected by means of an S1 interface ("S1") to an EPC (Evolved Packet Core), more specifically to mobility management entities/serving gateways (MME/S-GW) 230, 232 connected to a data packet network 234. The S1 interface supports a many-to-many relation between MMEs/S-GW 226, 228 and eNode Bs 216, 226, 228.

The eNode Bs 216, 226, 228 hosts the following functions: radio resource management: radio bearer control, radio admission control, connection mobility control, dynamic allocation of resources to UEs in both uplink and downlink (scheduling); IP header compression and encryption of user data stream; selection of an MME at UE attachment; routing of user plane data towards serving gateway; scheduling and transmission of paging messages (originated from the MME); scheduling and transmission of broadcast information; and measurement and measurement reporting configuration for mobility and scheduling.

The MME hosts the following functions: distribution of paging messages to the eNodes Bs 216, 226, 228; security control; idle state mobility control; System Architecture Evolution (SAE) bearer control; ciphering and integrity protection of Non-Access Stratum (NAS) signaling. The Serving Gateway hosts the following functions termination of U-plane packets for paging reasons and switching of U-plane for support of UE mobility.

The DL 220 from the eNode B 216 includes a plurality of communication channels relevant to download allocation that should be mapped to uplink location(s) for ACK discussed below, including a Physical Downlink Control Channel (PDCCH) 236, Physical Random Access Channel (PRACH) 242, and a semi-persistently scheduled communication channel depicted as Voice over IP (VoIP) 244. Mitigating any likelihood of a CRC being found correct when the data is in error, the eNB 216 has a random access response (RAR) Uplink (UL) grant with augmented CRC encoder 246. Similar, the UE 218 has an RAR UL Grant with Augmented CRC decoder 248.

Three different types of physical (PHY) channels are defined for the LTE downlink 220. One common characteristic of physical channels is that they all convey information from higher layers in the LTE stack. This is in contrast to physical signals, which convey information that is used exclusively within the PHY layer.

LTE DL physical channels are Physical Downlink Shared Channel (PDSCH), Physical Downlink Control Channel (PDCCH) 236, and Common Control Physical Channel (CCPCH) (not shown). Physical channels map to transport channels, which are service access points (SAPs) for the L2/L3 layers. Each physical channel has defined algorithms for bit scrambling, modulation, layer mapping, cyclic delay diversity (CDD) precoding, resource element assignment; layer mapping and pre-coding are related to MIMO applications. A layer corresponds to a spatial multiplexing channel.

A Broadcast Channel (BCH) has a fixed format and is broadcast over an entire coverage area of a cell. A Downlink Shared Channel (DL-SCH) supports Hybrid Automatic Repeat-reQuest (HARQ), supports dynamic link adaption by varying modulation, coding and transmit power, is suitable for transmission over entire cell coverage area, is suitable for use with beamforming, supports dynamic and semi-static resource allocation, and supports discontinuous receive (DRX) for power save. A Paging Channel (PCH) supports UE DRX, requires broadcast over entire cell coverage area, and is mapped to dynamically allocated physical resources. A Multicast Channel (MCH) is required for broadcast over entire cell coverage area, supports Multicast/broadcast—single frequency network (MB-SFN), supports semi-static resource allocation. Supported transport channels are Broadcast channel (BCH), Paging channel (PCH), Downlink shared channel (DL-SCH), and Multicast channel (MCH). Transport channels provide the following functions: structure for passing data to/from higher layers, a mechanism by which higher layers can configure the PHY status indicators (packet error, CQI etc.) to higher layers, and support for higher-layer peer-to-peer signaling. Transport channels are mapped to physical channels as follows: BCH maps to CCPCH, although mapping to PDSCH under consideration. PCH and DL-SCH maps to PDSCH. MCH may be mapped to PDSCH.

Figure 3:
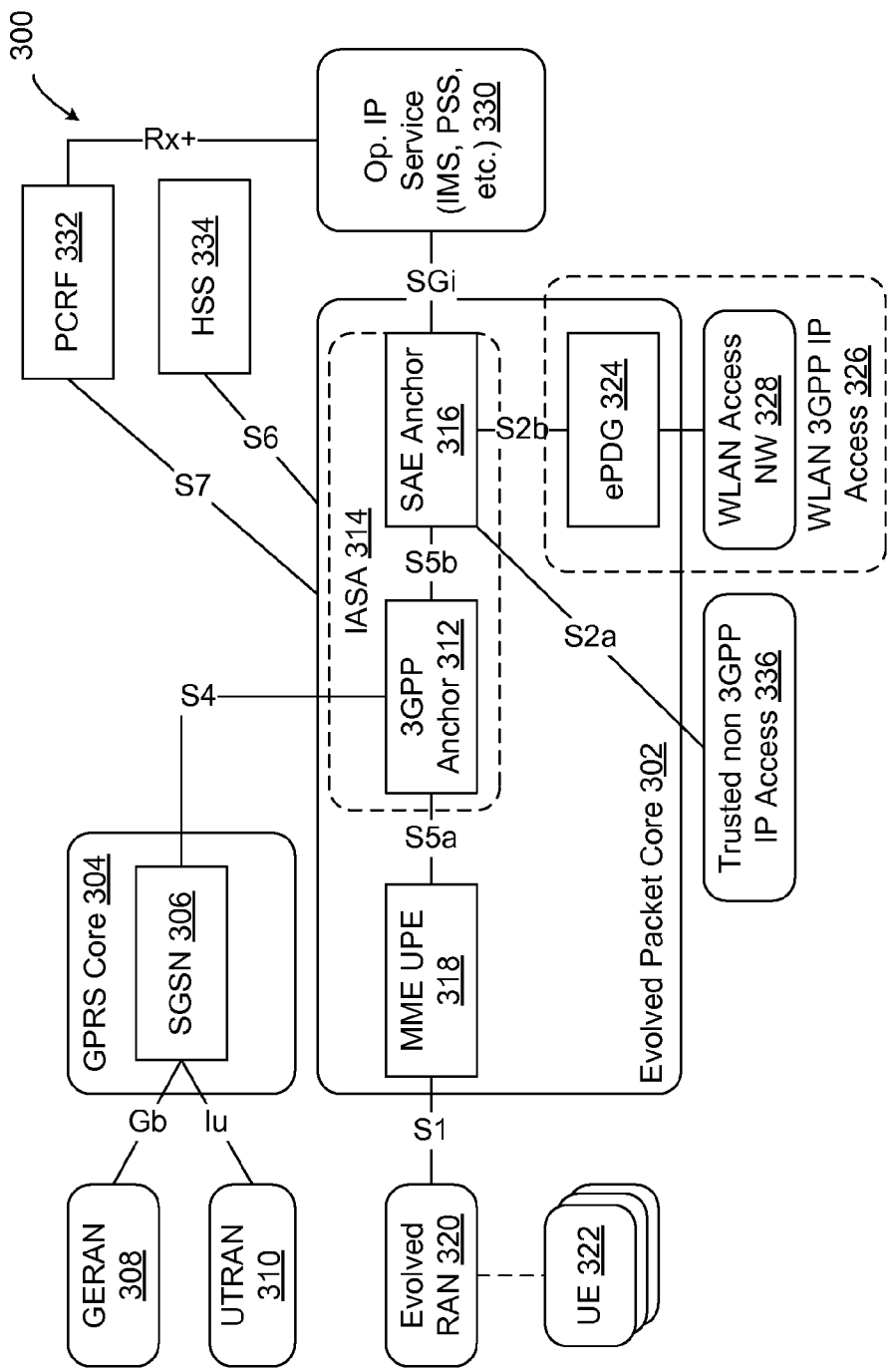
FIG. 3 depicts a diagram of a communication system incorporating a legacy General Packet Radio Service (GPRS) core and an evolved packet core supporting augmented cyclic redundancy checking in random access responses.

In FIG. 3, in another aspect, a communication system 300 that can encompass the communication systems 100, 200 of FIGS. 1-2 includes support for interfacing an evolved packet core 302 via an interface S4 with a legacy General Packet Radio Service (GPRS) core 304, whose Serving GPRS Support Node (SGSN) 306 is interfaced in turn by a Gb interface to a Global System for Mobile Communications (GSM)/Edge Radio Access Network (GERAN) 308 and via an Iu interface to a UTRAN 310. The S4 provides the user plane with related control and mobility support between GPRS Core 304 and a 3GPP Anchor 312 of an Inter Access Stratum Anchor (IASA) 314 and is based on a Gn reference point as defined between SGSN 306 and Gateway GPRS Serving/Support Node (GGSN) (not shown). The IASA 314 also includes a system architecture evolved (SAE) anchor 316 interfaced to the 3GPP anchor 312 by an S5b interface that provides the user plane with related control and mobility support. The 3GPP anchor 312 communicates with an MME UPE 318 via interface S5a. Mobility Management entity (MME) pertains to distribution of paging messages to the eNBs and User Plane Entity (UPE) pertains to IP header compression and encryption of user data streams, termination of U-plane packets for paging reasons, and switching of U-plane for support of UE mobility. The MME UPE 318 communicates via interface S1 to an evolved RAN 320 for wirelessly communicating with UE devices 322.

An S2b interface provides the user plane with related control and mobility support between the SAE Anchor 316 and an evolved Packet Data Gateway (ePDG) 324 of a wireless local access network (WLAN) 3GPP IP Access component 326 that also includes a WLAN Access network (NW) 328. An SGi interface is the reference point between the Inter AS Anchor 316 and a packet data network 330. Packet data network 330 may be an operator external public or private packet data network or an intra operator packet data network, e.g. for provision of IP Multimedia Subsystem (IMS) services. This SGi reference point corresponds to Gi and Wi functionalities and supports any 3GPP and non-3GPP access systems. An Rx+ interface provides communication between the packet data network 330 and a policy and charging rules function (PCRF) 332, which in turn communicates via an S7 interface to the evolved packet core 302. The S7 interface provides transfer of (QoS) policy and charging rules from PCRF 332 to Policy and Charging Enforcement Point (PCEP) (not shown). An S6 interface (i.e., AAA interface) enables transfer of subscription and authentication data for authenticating/authorizing user access by interfacing the evolved packet core 302 to a home subscriber service (HSS) 334. An S2a interface provides the user plane with related control and mobility support between a trusted non 3GPP IP access 336 and the SAE Anchor 316.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
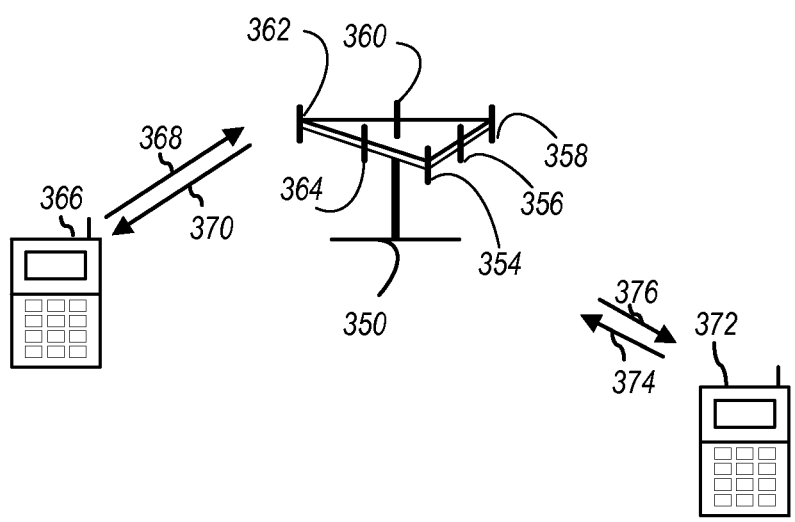
FIG. 4 depicts a diagram of a multiple access wireless communication system according to one aspect for augmented cyclic redundancy checking in random access responses.

Referring to FIG. 4, a multiple access wireless communication system according to one aspect is illustrated. An access point 350 (AP) includes multiple antenna groups, one including 354 and 356, another including 358 and 360, and an additional including 362 and 364. In FIG. 4, only two antennas are shown for each antenna group, however, more or fewer antennas may be utilized for each antenna group. Access terminal (AT) 366 is in communication with antennas 362 and 364, where antennas 362 and 364 transmit information to access terminal 366 over forward link 370 and receive information from access terminal 366 over reverse link 368. Access terminal 372 is in communication with antennas 356 and 358, where antennas 356 and 358 transmit information to access terminal 372 over forward link 376 and receive information from access terminal 372 over reverse link 374. In a FDD system, communication links 368, 370, 374 and 376 may use different frequency for communication. For example, forward link 370 may use a different frequency then that used by reverse link 368. Each group of antennas and/or the area in which they are designed to communicate is often referred to as a sector of the access point 350. In the aspect, antenna groups each are designed to communicate to access terminals 366, 372 in a sector of the areas covered by access point 350.

In communication over forward links 370 and 376, the transmitting antennas of access point 350 utilize beamforming in order to improve the signal-to-noise ratio of forward links for the different access terminals 366 and 374. Also, an access point using beamforming to transmit to access terminals scattered randomly through its coverage causes less interference to access terminals in neighboring cells than an access point transmitting through a single antenna to all its access terminals.

An access point 350 may be a fixed station used for communicating with the terminals and may also be referred to as an access point, a Node B, or some other terminology. An access terminal 366, 372 may also be called user equipment (UE), a wireless communication device, terminal, access terminal or some other terminology.

Figure 5:
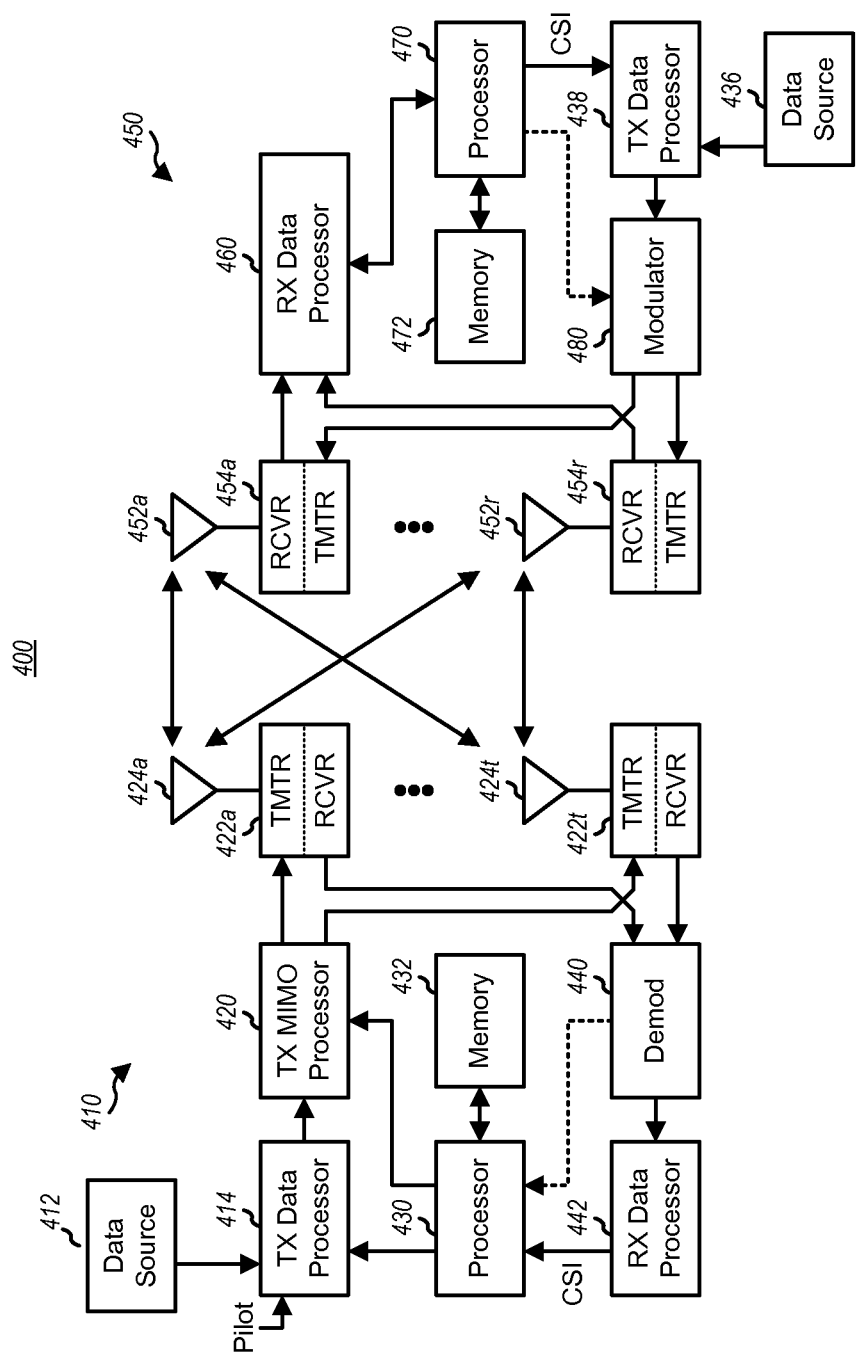
FIG. 5 depicts a schematic block diagram of a communication system for supporting augmented cyclic redundancy checking in random access responses.

FIG. 5 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430. The processor 430 can be coupled to memory 432.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain implementations, TX MIMO processor 420 applies beamforming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion. The processor 470 can be coupled to memory 472.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SD-CCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 6:
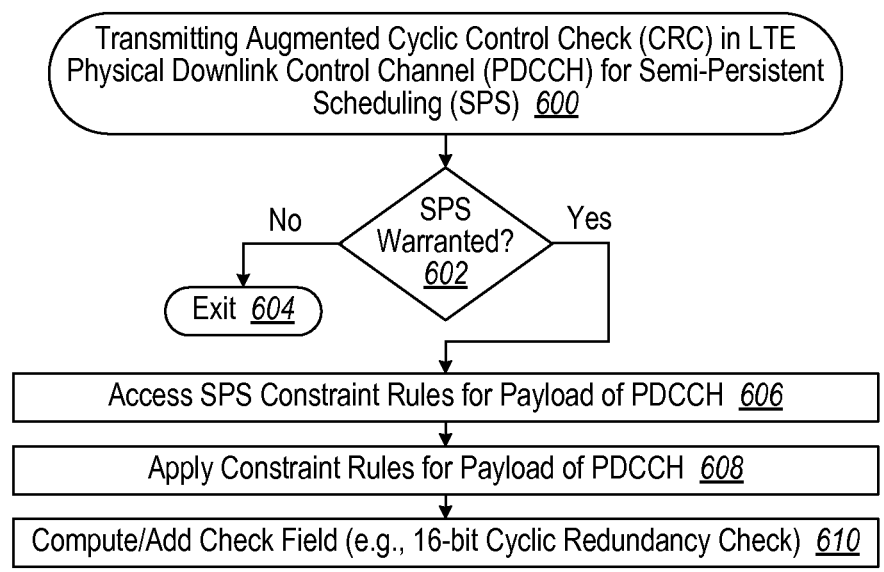
FIG. 6 depicts a flow diagram of a methodology for transmitting augmented CRC (cyclic redundancy check) in an LTE (Long Term Evolution) PDCCH for SPS.

In FIG. 6, a methodology 600 is depicted for transmitting augmented CRC in an LTE (Long Term Evolution) PDCCH for SPS. At the eNB, a determination is made that SPS is warranted (block 602), and if not the methodology exits (block 604) continuing to perform dynamic scheduling. If warranted, then SPS constraint rules for PDCCH payload are accessed (block 606). These constraint rules are applied on the PDCCH payload in order to augment validity checking at the UE (block 608). The PDCCH payload is then computer for CRC and the CRC is added to the payload (block 610).

Figure 7:
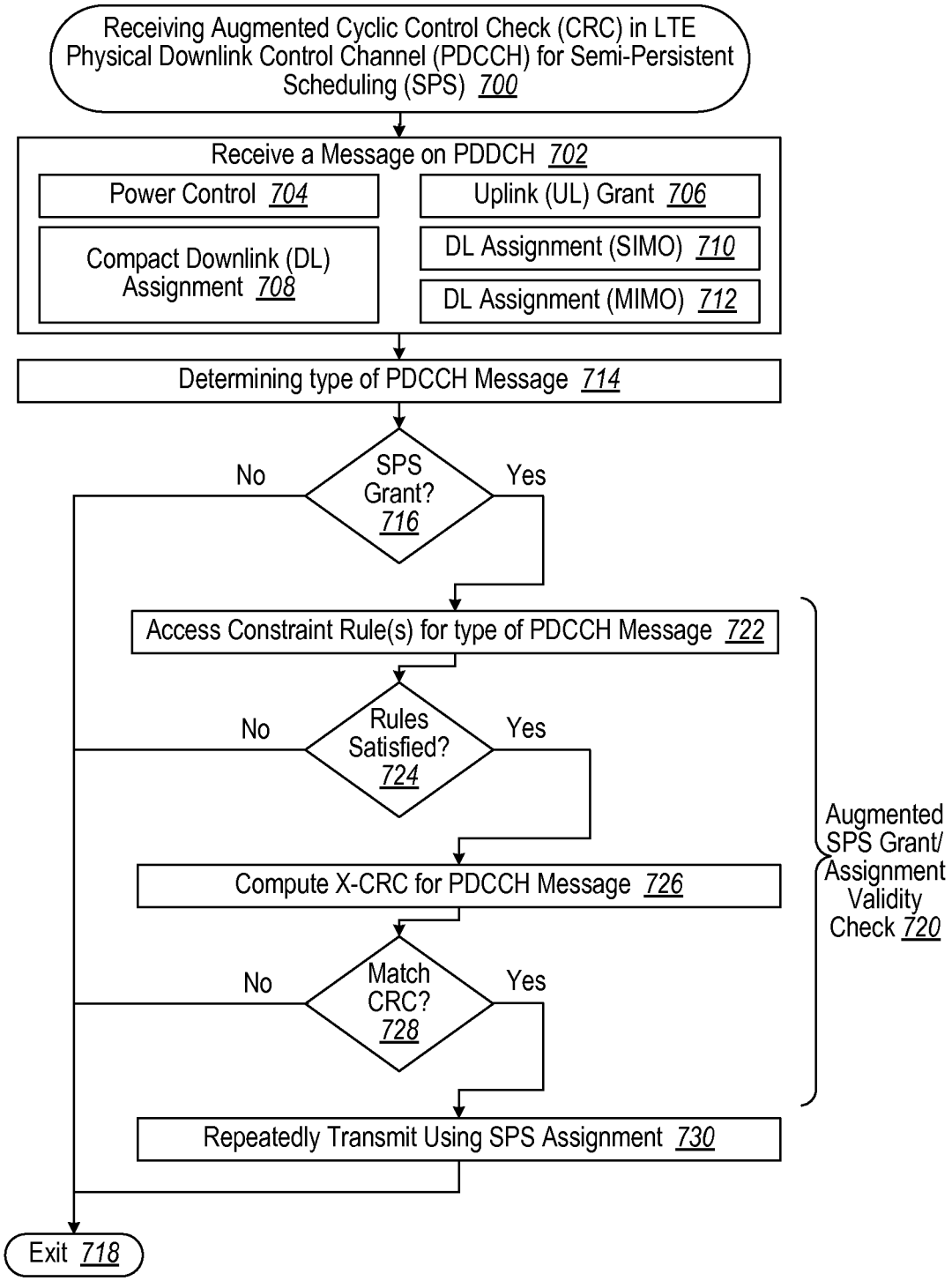
FIG. 7 depicts a flow diagram of a methodology 700 is depicted for receiving augmented CRC in LTE PDCCH (physical downlink control channel) for SPS at the UE.

In FIG. 7, a methodology 700 is depicted for receiving augmented CRC in LTE PDCCH for SPS at the UE. If false alarm PDCCH SPS grant is decoded as an uplink grant, the UE will repeatedly transmit on some random resources every serving interval. UE will look for Ack/Nak feedback on PHICH and will randomly decode an Ack or Nak. If Nak is decoded UE will keep on retransmitting on a resource that it does not own. This transmission may collide with other UL-SCH transmissions and therefore hurt system throughput. The corresponding VoIP frames from the UE experiencing false alarm get lost on the air, eNB is not trying to decode them, and UE may receive Ack for them. eNB cannot find out which UE is jamming, because it does not know what to look for.

As discussed above, false alarm grants can have quite serious consequences when semi persistent scheduling is used. Advantageously, the disclosed innovations can be made to discriminate false alarms from authentic grants. Standardizing a set of rules can dictate if a grant that indicate SPS is authentic or false alarm. In this description we focus on the uplink, because the consequences of uplink jamming are more severe than the consequences of false alarm on the downlink, although it should be appreciated that aspects disclosed herein can be applied to the downlink.

Continuing with FIG. 7, the UE receives a message on PDCCH (block 702). This message can be power control 704, uplink (UL) grant 706, compact downlink (DL) assignment 708, DL assignment 710 for a SIMO (single input multiple output) UE, DL assignment 712 for a MIMO (multiple input multiple output) UE. In block 714, the type of PDCCH message is determined. A determination is made as to whether this PDCCH message is a semi-persistent scheduling (SPS) grant (block 716), if not the methodology 700 exits at 718. If SPS is indicated, then the UE performs augmented SPS grant/assignment validity checking as depicted at 720.

In block 722, constraint rule(s) are accessed for the type of PDCCH message. In an exemplary aspect, an illustrative format of PDCCH for UL grants is indicated in TABLE 1.

TABLE 1

PDCCH Formats and Contents - Format 0 for UL Grants.

Format 0 - UL-SCH assignments

| Field | N_RB = 25 Bit-Width | N_RB = 50 Bit-Width | N_RB = 100 Bit-Width | Notes |
|---|---|---|---|---|
| Flag format0/format1A differentiation | 1 | 1 | 1 | |
| Hopping flag | 1 | 1 | 1 | |
| Resource allocation & explicit hopping | 9 | 11 | 13 | Starting RB & number of consecutive RBs |
| MCS | 5 | 5 | 5 | 32 levels of MCS (compute TBS from RB assignment |
| NDI | 1 | 1 | 1 | Separate new data indicator (1 bit). New data transmissions transmitted with RV = 0. Other RVs indicated with 3 reserved MCS values for scheduled re-transmissions |
| TPC | 2 | 2 | 2 | TPC command for PUSCH |
| Cyclic shift for DM RS | 3 | 3 | 3 | Necessary for SDMA (less than 8 users) |
| UL index (TDD only) | 0 | 0 | 0 | Indicate which subframe(s) the grant is valid for. Necessary for TDD. Bit width depends on DL/UL allocation |
| Aperiodic CQI request | 1 | 1 | 1 | |
| CRC | 16 | 16 | 16 | CRC masked by UE MAC ID |
| Total: | 39 | 41 | 43 | |

In an aspect, as depicted at block 724, a determination is made if the constraint rule(s) are satisfied. Restrictions or constraints on the possible formats of SPS PDCCH provide an augmentation for CRC validity checking (virtual CRC). If satisfied, then a computed validity check value (X-CRC) is determined for the PDCCH message payload (block 726). Then a determination is made as to whether the computed validity check value (X-CRC) matches the appended CRC (block 728). If so, then in block 730 the eNB transmits only the allowed SPS PDCCH grants. Thus, with reference back at block 724, the UE ignores SPS PDCCH grants that do not meet the rules. This augmented checking ensures that more false alarms SPS PDCCH grants are ignored by UE.

Figure 8:
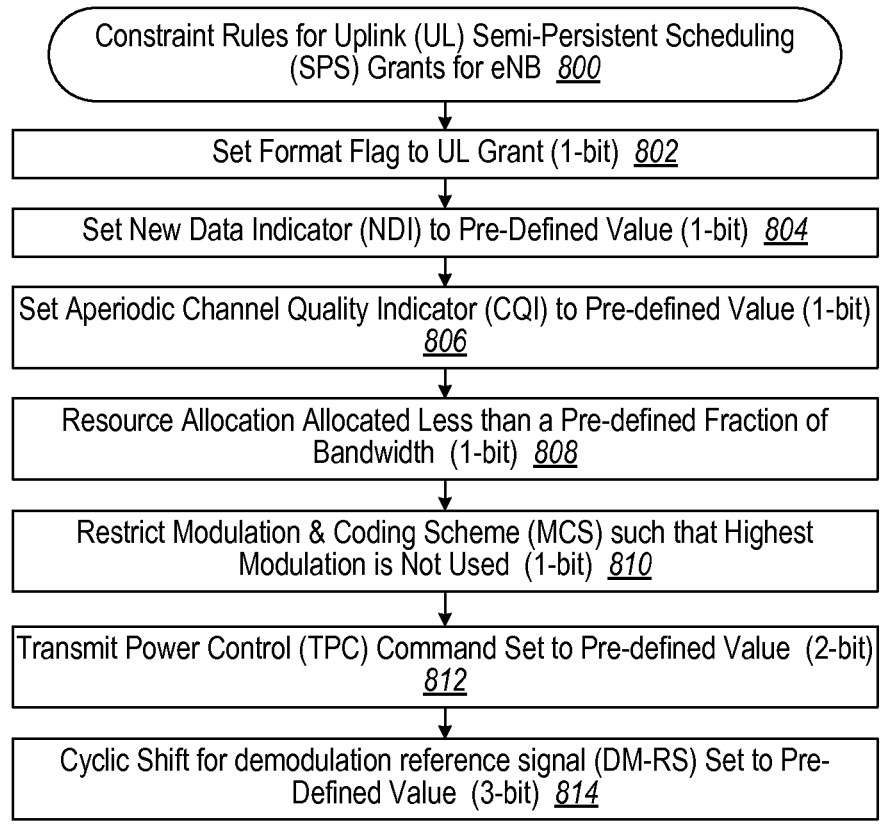
FIG. 8 depicts a methodology comprising a set of conditions (constraint rules) for uplink (UL) SPS grants.

In exemplary aspect, the following eNB constraint rules can be used. In FIG. 8, a methodology 800 can comprise a set of conditions (constraint rules) for UL SPS grants. The eNB can satisfy constraints rules as follows:

(a) Set format flag to UL grant (1 bit) (block 802);

(b) Set NDI to a defined value (new transmission) (1 bit) (block 804);

(c) Set Aperiodic CQI to a defined value (e.g., Aperiodic CQI not reported) (1 bit) (block 806);

(d) Resource allocation must allocate less than a defined fractions of the bandwidth (1 bit) (block 808);

(e) Possible restrict MCS, such that the highest modulation is not used (1 bit) (block 810);

(f) The transmit power control (TPC) command must be set to a pre-defined value (2 bits) (block 812); and (g) The cyclic shift for demodulation reference signal (DM-RS) must be set to a pre-defined value (3 bits) (block 814).

If not satisfied, then the UE does not continue evaluating the PDCCH SPS for validity based solely on CRC.

Figure 9:
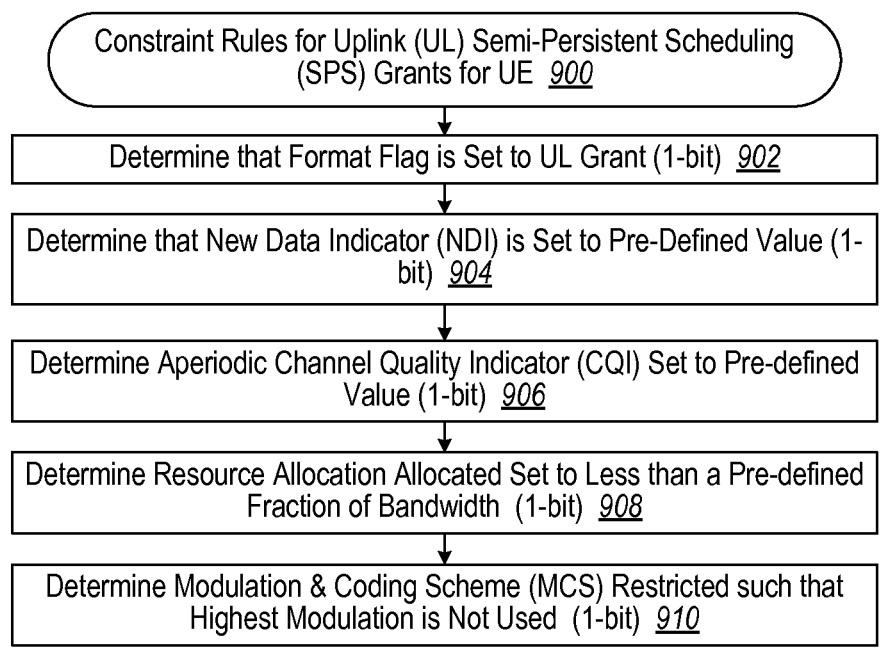
FIG. 9 depicts a methodology for evaluating constraints rules for UL SPS grants at the UE.

Similarly, in FIG. 9, a methodology 900 is depicted for evaluating constraints rules for UL SPS grants at the UE. It should be appreciated that the UE can determine whether the PDCCH is otherwise indicating dynamic scheduling rather than semi-persistent scheduling. After figuring that a grant is a SPS grant, the UE obeys the SPS grant only if for UL grants a set of rules is matched such as for example: (a) The format flag indicates UL grant (block 902); (b) The NDI is set to the defined value (new transmission) (block 904); (c) The Aperiodic CQI is set to the defined value (e.g., Aperiodic CQI not reported) (block 906); (d) The Resource allocation is valid, i.e. it does not allocate more than the defined fraction of the bandwidth (block 908); and (e) The MCS is a valid MCS for SPS, given the restrictions (block 910).

These rules constrain 5 bits on the PDCCH payload bits. Therefore the technique above is similar to extending the PDCCH CRC to 21 bits for SPS grants.

While false alarms on downlink grants have less serious consequences, similar techniques can be applied. There are three formats for downlink grants, the compact DL (See TABLE 2), the SIMO DL (See TABLE 3) and the MIMO DLA (See TABLE 4).

TABLE 2

PDCCH Formats and Contents - Format 1A for compact DL assignments.

Format 1A - Compact DL-SCH assignments

| Field | N_RB = 25 Bit-Width | N_RB = 50 Bit-Width | N_RB = 100 Bit-Width | Notes |
|---|---|---|---|---|
| Flag format0/format1A differentiation | 1 | 1 | 1 | |
| Distributed transmission flag | 1 | 1 | 1 | |

TABLE 2-continued

PDCCH Formats and Contents - Format 1A for compact DL assignments.

Format 1A - Compact DL-SCH assignments

| Field | N_RB = 25 Bit-Width | N_RB = 50 Bit-Width | N_RB = 100 Bit-Width | Notes |
|---|---|---|---|---|
| Resource allocation | 9 | 11 | 13 | Starting VRB & number of consecutive VRBs |
| MCS | 5 | 5 | 5 | 32 levels of MCS (compute TBS from RB assignment. Reduction in number of bits for MCS in FFS. |
| HARQ process id | 3 | 3 | 3 | HARQ process ID derived from the subframe ID (4b for TDD) |
| Retransmission sequence number | 3 | 3 | 3 | Separate new data indicator (1 bit) & redundancy versions (2 bits) |
| TPC | 2 | 2 | 2 | TPC command for PUCCH |
| CRC | 16 | 16 | 16 | CRC masked by UE MAC ID |
| Total: | 40 | 42 | 44 | |

Figure 10:
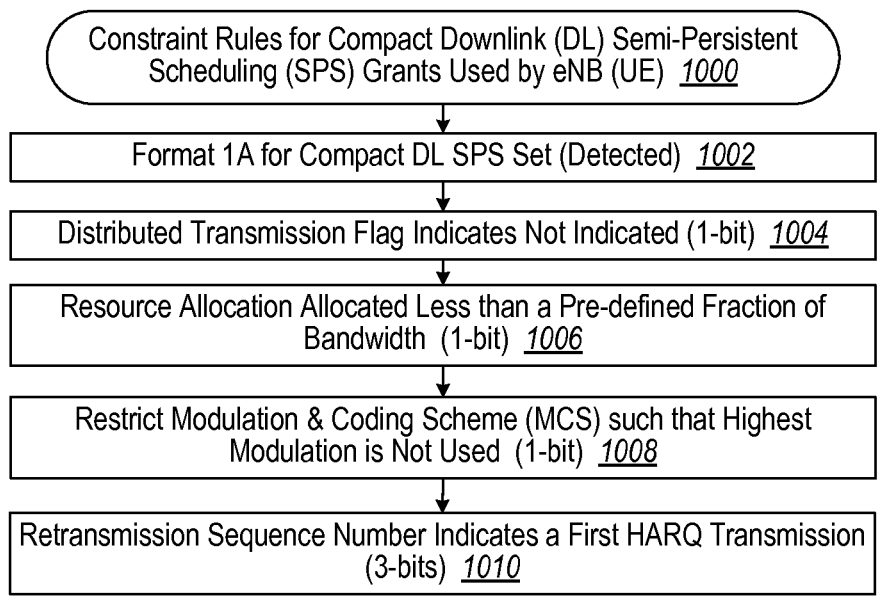
FIG. 10 depicts a methodology comprised of a set of rules used by an evolved base node (eNB) for downlink (DL) compact.

In FIG. 10, an illustrative set of rules used by eNB for DL compact is depicted as methodology 1000: (1) set to format 1A (TABLE 1) (block 1002); (2) Distributed transmission flag indicates not distributed (block 1004); (3) Resource allocation must allocate less than a defined fractions of the bandwidth (1-bit) (block 1006); (4) Possible restrict MCS, such that the highest modulation is not used (1 bit) (block 1008); and (5) Retransmission sequence number indicates a first HARQ transmission (3 bits) (block 1010).

Figure 11:
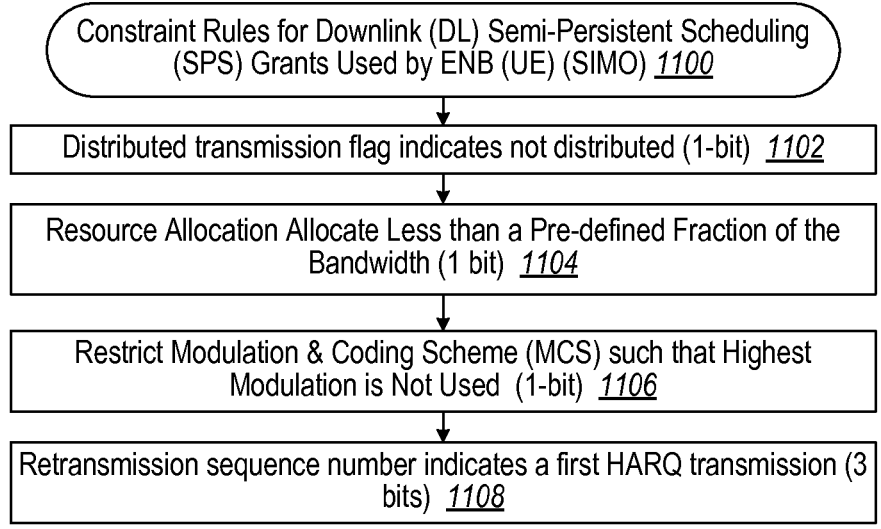
FIG. 11, a methodology 1100 utilizes an illustrative set of constraint rules used by eNB for SIMO (Single Input Multiple Output) DL.

In FIG. 11, a methodology 1100 utilizes an illustrative set of constraint rules used by eNB for SIMO (Single Input Multiple Output) DL in accordance to a Format 1 of TABLE 3: (1) Distributed transmission flag indicates not distributed (block 1102); (2) Resource allocation allocates less than a pre-defined fraction of the bandwidth (1 bit) (block 1104); (3) Possible restrict MCS, such that the highest modulation is not used (1 bit) (block 1106); (4) Retransmission sequence number indicates a first HARQ transmission (3 bits) (block 1108).

As a first exemplary option, consider the following set of rules used by eNB for MIMO DL: In an exemplary aspect, MIMO DL cannot be used with SPS, thus the UE disregards any PDCCH indicating SPS and MIMO.

TABLE 3

PDCCH Formats and Contents - Format 1 for DL assignments in SIMO.

Format 1-DL-SCH assignments for SIMO

| Field | N_RB = 25 Bit-Width | N_RB = 50 Bit-Width | N_RB = 100 Bit-Width | Notes |
|---|---|---|---|---|
| Resource allocation header | 1 | 1 | 1 | Indication of resource allocation type 0 or type 1 |
| Resource allocation | 13 | 17 | 25 | Bitmap with allocation for type 0, set indication & bitmap therein for type 1 |
| MCS | 5 | 5 | 5 | 32 levels of MCS (compute TBS from RB assignment. |
| HARQ process id | 3 | 3 | 3 | Maximum 8 HARQ processes |
| Retransmission sequence number | 3 | 3 | 3 | Separate new data indicator (1 bit) & redundancy versions (2 bits) |
| TPC | 2 | 2 | 2 | TPC command for PUCCH |
| CRC | 16 | 16 | 16 | CRC masked by UE MAC ID |
| Total: | 43 | 49 | 55 | |

TABLE 4

PDCCH Formats and Contents - Format 2 for DL assignments in MIMO.

Format 2-DL-SCH assignments for MIMO

| Field | N_RB = 25 Bit-Width | N_RB = 50 Bit-Width | N_RB = 100 Bit-Width | Notes |
|---|---|---|---|---|
| Resource allocation header | 1 | 1 | 1 | Indication of resource allocation type 0 or type 1 |
| Resource allocation | 13 | 17 | 25 | Bitmap with allocation for type 0, set indication & bitmap therein for type 1 |
| TPC | 2 | 2 | 2 | TPC command for PUCCH |
| HARQ process ID | 3 | 3 | 3 | 3 bits for FDD, 4 bits for TDD |

TABLE 4-continued

PDCCH Formats and Contents - Format 2 for DL assignments in MIMO.

Format 2-DL-SCH assignments for MIMO

| Field | N_RB = 25 Bit-Width | N_RB = 50 Bit-Width | N_RB = 100 Bit-Width | Notes |
|---|---|---|---|---|
| HARQ swap flag | 1 | 1 | 1 | |
| MCS first Transport Block (TrBlk) | 5 | 5 | 5 | 32 levels of MCS (compute TBS from RB assignment. |
| Retransmission sequence number $1^{st}$ TrBlk | 3 | 3 | 3 | Separate new data indicator (1 bit) & redundancy versions (2 bits) |
| MCS second TrBlk | 5 | 5 | 5 | FFS if possible to reduce to 3 bits by interpretation together with MCS for first CW |
| Retransmission sequence number second TrBlk | 3 | 3 | 3 | Separate new data indicator (1 bit) & redundancy versions (2 bits) |
| Precoding information | 3 | 3 | 3 | Precoding matrix (4 bits for 4 Tx, 1-3 bits for 2 Tx), FFS if this field can be removed & semi-static configuration is used instead |
| CRC | 16 | 16 | 16 | CRC masked by UE MAC ID |
| Total: | 55 | 59 | 67 | |

Figure 12:
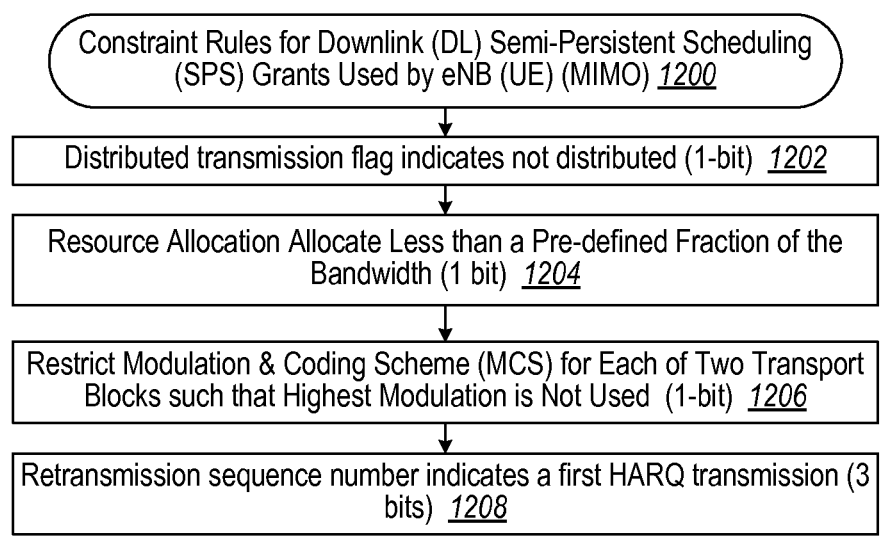
FIG. 12 depicts a methodology comprising a set of rules used by eNB for MIMO (multiple input multiple output) DL.

In FIG. 12, as a second exemplary option, consider the following set of constraint rules depicted as a methodology 1200 comprising the following set of rules used by eNB for MIMO DL of TABLE 4: (1) Distributed transmission flag indicates not distributed (block 1202); (2) Resource allocation must allocate less than a defined fractions of the bandwidth (1 bit) (block 1204); (3) Possible restrict MCS for each of the two transport blocks, such that the highest modulation is not used (1 bit) (block 1206); and (4) Retransmission sequence number indicates a first HARQ transmission (3 bits) for first and second transport block (block 1208).

Figure 13:
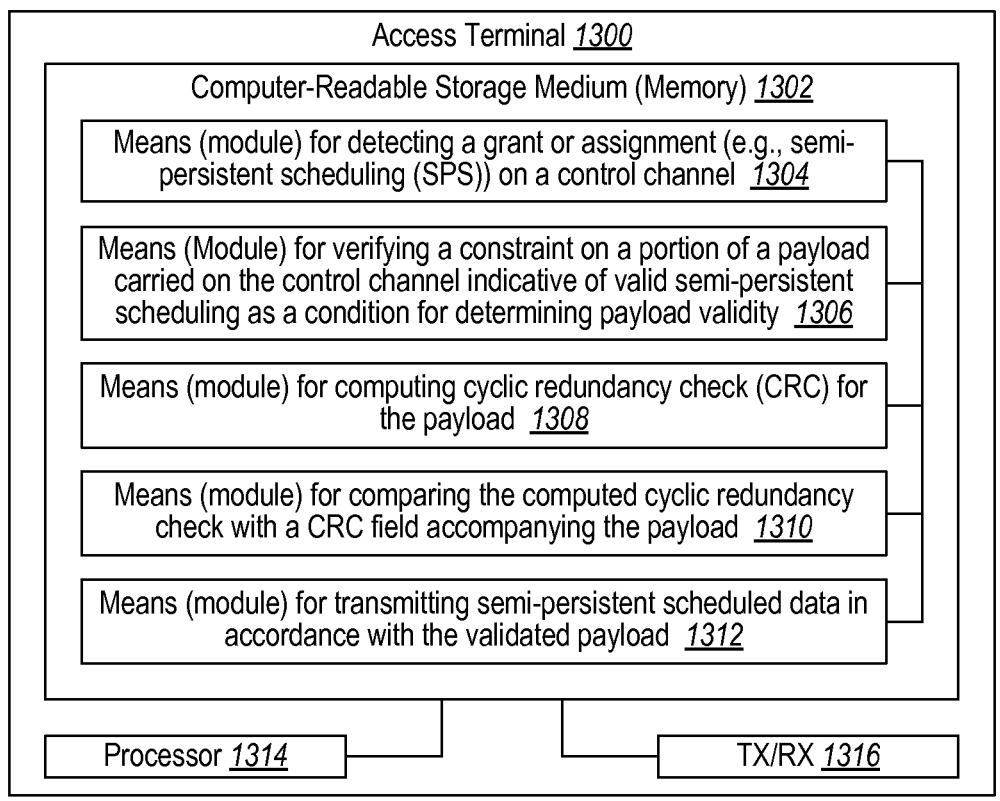
FIG. 13 illustrates a block diagram of an access terminal having modules for receiving augmented cyclic redundancy checking in random access responses.
Figure 14:
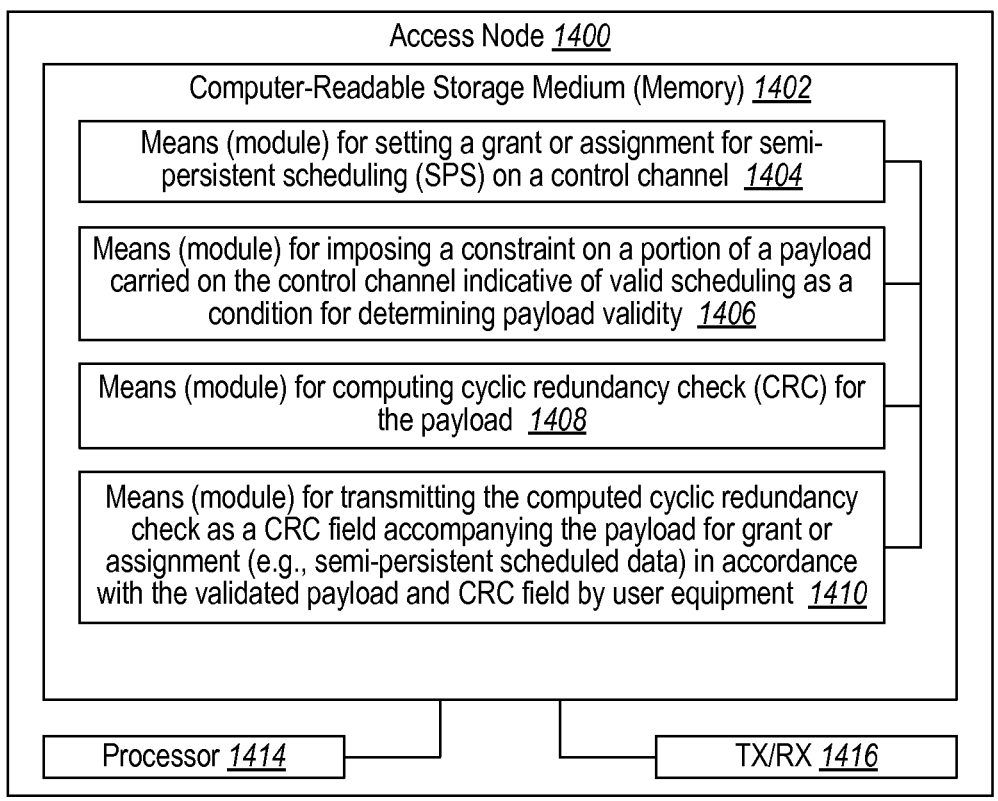
FIG. 14 illustrates a block diagram of an access node having modules for transmitting augmented cyclic redundancy checking in random access responses.

In FIG. 13, an access terminal (e.g., user equipment) 1300 has computing platform 1302 that provides means for receiving a semi-persistent scheduling indication from an access node (FIG. 14). In particular, the computing platform 1302 comprises sets of instructions or code (modules) 1304-1312 executable by a processor 1314 that also controls transmission and reception by a transceiver ("Tx/Rx") 1316. In particular, means (module) 1304 are provided for detecting a grant for semi-persistent scheduling (SPS) on a control channel. Means (module) 1306 are provided for verifying a constraint on a portion of a payload carried on the control channel indicative of valid semi-persistent scheduling as a condition for determining payload validity. Means (module) 1308 are provided for computing cyclic redundancy check (CRC) for the payload. Means (module) 1310 are provided for comparing the computed cyclic redundancy check with a CRC field accompanying the payload. Means (module) 1312 are provided for transmitting semi-persistent scheduled data in accordance with the validated payload. Thereby, the access node 1300 provides that the verified unused control field that augments the check field to mitigate possibility of the check field indicating correct reception with an error in the random access response.

In FIG. 14, an access node (e.g., eNB) 1400 has computing platform 1402 that provides means for causing a computer for transmitting a semi-persistent scheduling indication for enhanced validity determination by an access terminal (e.g., user equipment). In particular, the computing platform 1402 comprises sets of instructions or code (modules) 1404-1410 executable by a processor 1414 that also controls transmission and reception by a transceiver ("Tx/Rx") 1416. In particular, means (module) 1404 are provided for setting a grant for semi-persistent scheduling (SPS) on a control channel. Means (module) 1406 are provided for imposing a constraint on a portion of a payload carried on the control channel indicative of valid semi-persistent scheduling as a condition for determining payload validity. Means (module) 1408 are provided for computing cyclic redundancy check (CRC) for the payload. Means (module) 1410 are provided for transmitting the computed cyclic redundancy check as a CRC field accompanying the payload for granting transmission of semi-persistent scheduled data in accordance with the validated payload and CRC field by user equipment.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for receiving a scheduling indication and for performing multiple error checking not only relying on a validity check field comprising a cyclic redundancy check (CRC), the method comprising:
   detecting a grant or assignment of radio resources in a wireless communication system on a control channel;
   determining whether a portion of a payload on the control channel satisfies a constraint, the constraint comprising a new data indicator set to a pre-determined value;
   determining that the grant or assignment is valid if the constraint is satisfied and there is a CRC match;
   determining that the grant or assignment is invalid if the constraint is not satisfied regardless of whether there is a CRC match; and
   transmitting or receiving in accordance with the payload on the control channel in response to a determination that the grant or assignment is valid.

2. The method of claim 1, wherein the grant or assignment is for semi-persistent scheduling.

3. The method of claim 1, wherein the constraint on the portion of the payload further comprises an uplink grant flag, an aperiodic channel quality indicator set to a pre-defined value, a resource allocation allocated to less than a pre-defined fraction of bandwidth, or a restricted modulation and coding scheme that does not use highest modulations.

4. The method of claim 1, wherein the constraint on the portion of the payload further comprises an uplink grant flag.

5. The method of claim 1, wherein the constraint on the portion of the payload further comprises an aperiodic channel quality indicator set to a pre-defined value.

6. The method of claim 1, wherein the constraint on the portion of the payload further comprises a resource allocation allocated to less than a pre-defined fraction of bandwidth.

7. The method of claim 1, wherein the constraint on the portion of the payload further comprises a restricted modulation and coding scheme that does not use highest modulations.

8. The method of claim 1, wherein the constraint on the portion of the payload further comprises a compact downlink assignment for semi-persistent scheduling.

9. The method of claim 8, wherein the constraint on the portion of the payload further comprises a distributed transmission flag set to not indicated.

10. The method of claim 8, wherein the constraint on the portion of the payload further comprises a resource allocation allocated less than a pre-defined fraction of bandwidth.

11. The method of claim 8, wherein the constraint on the portion of the payload further comprises a restricted modulation and coding scheme that does not use a highest modulation.

12. The method of claim 8, wherein the constraint on the portion of the payload further comprises a retransmission sequence number indicating a first Hybrid Automatic Repeat-reQuest (HARQ) transmission.

13. The method of claim 8, wherein the constraint on the portion of the payload further comprises a distributed transmission flag set to not indicated, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

14. The method of claim 1, further comprising detecting a downlink assignment for single input multiple output (SIMO) semi-persistent scheduling.

15. The method of claim 14, wherein the constraint on the portion of the payload further comprises a distributed transmission flag indicating not distributed.

16. The method of claim 14, wherein the constraint on the portion of the payload further comprises a resource allocation allocated less than a pre-defined fraction of bandwidth.

17. The method of claim 14, wherein the constraint on the portion of the payload further comprises a restricted modulation and coding scheme that does not use a highest modulation.

18. The method of claim 14, wherein the constraint on the portion of the payload further comprises a retransmission sequence number indicating a first Hybrid Automatic Repeat-reQuest (HARQ) transmission.

19. The method of claim 14, wherein the constraint on the portion of the payload further comprises a distributed transmission flag indicating not distributed, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

20. The method of claim 1, further comprising determining invalidity of the portion of the payload by detecting an indication for MIMO semi-persistent scheduling.

21. The method of claim 20, wherein the constraint on the portion of the payload further comprises a distributed transmission flag indicating not distributed.

22. The method of claim 20, wherein the constraint on the portion of the payload further comprises a resource allocation allocated less than a pre-defined fraction of bandwidth.

23. The method of claim 20, wherein the constraint on the portion of the payload further comprises a restricted modulation and coding scheme for each of two transport blocks that does not use a highest modulation.

24. The method of claim 20, wherein the constraint on the portion of the payload further comprises a retransmission sequence number indicating a first Hybrid Automatic Repeat-reQuest (HARQ) transmission.

25. The method of claim 20, wherein the constraint on the portion of the payload further comprises a distributed transmission flag indicating not distributed, a resource allocation allocated less than a pre-defined fraction of bandwidth, a restricted modulation and coding scheme for each of two transport blocks that does not use a highest modulation, and a retransmission sequence number indicating a first Hybrid Automatic Repeat-reQuest (HARQ) transmission.

26. The method of claim 1, further comprising determining there is a CRC match when a computed CRC value matches an appended CRC value of the payload.

27. An apparatus for receiving a scheduling indication and for performing multiple error checking not only relying on a validity check field comprising a cyclic redundancy check (CRC), the apparatus comprising:
at least one processor configured to:
detect a grant or assignment of radio resources in a wireless communication system on a control channel;
determine whether a portion of a payload on the control channel satisfies a constraint, the constraint comprising a new data indicator set to a pre-determined value;
determine that the grant or assignment is valid if the constraint is satisfied and there is a CRC match;
determine that the grant or assignment is invalid if the constraint is not satisfied regardless of whether there is a CRC match; and
transmit or receive in accordance with the payload on the control channel in response to a determination that the grant or assignment is valid.

28. The apparatus of claim 27, wherein the grant or assignment is for semi-persistent scheduling.

29. The apparatus of claim 27, wherein the constraint on the portion of the payload further comprises an uplink grant flag, an aperiodic channel quality indicator set to a pre-defined value, a resource allocation allocated to less than a pre-defined fraction of bandwidth, or a restricted modulation and coding scheme that does not use highest modulations.

30. The apparatus of claim 27, wherein the constraint on the portion of the payload further comprises an uplink grant flag.

31. The apparatus of claim 27, wherein the constraint on the portion of the payload further comprises an aperiodic channel quality indicator set to a pre-defined value.

32. The apparatus of claim 27, wherein the constraint on the portion of the payload further comprises a resource allocation allocated to less than a pre-defined fraction of bandwidth.

33. The apparatus of claim 27, wherein the constraint on the portion of the payload further comprises a restricted modulation and coding scheme that does not use highest modulations.

34. The apparatus of claim 27, wherein the constraint on the portion of the payload further comprises a compact downlink assignment for semi-persistent scheduling.

35. The apparatus of claim 34, wherein the constraint on the portion of the payload further comprises a distributed transmission flag set to not indicated.

36. The apparatus of claim 34, wherein the constraint on the portion of the payload further comprises a resource allocation allocated less than a pre-defined fraction of bandwidth.

37. The method of claim 34, wherein the constraint on the portion of the payload further comprises a restricted modulation and coding scheme that does not use a highest modulation.

38. The apparatus of claim 34, wherein the constraint on the portion of the payload further comprises a retransmission sequence number indicating a first Hybrid Automatic Repeat-reQuest (HARQ) transmission.

39. The apparatus of claim 34, wherein the constraint on the portion of the payload further comprises a distributed transmission flag set to not indicated, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

40. The apparatus of claim 27, wherein the processor is further configured to detect a downlink assignment for single input multiple output (SIMO) semi-persistent scheduling.

41. The apparatus of claim 40, wherein the constraint on the portion of the payload further comprises a distributed transmission flag indicating not distributed.

42. The apparatus of claim 40, wherein the constraint on the portion of the payload further comprises a resource allocation allocated less than a pre-defined fraction of bandwidth.

43. The apparatus of claim 40, wherein the constraint on the portion of the payload further comprises a restricted modulation and coding scheme that does not use a highest modulation.

44. The apparatus of claim 40, wherein the constraint on the portion of the payload further comprises a retransmission sequence number indicating a first Hybrid Automatic Repeat-reQuest (HARQ) transmission.

45. The apparatus of claim 40, wherein the constraint on the portion of the payload further comprises a distributed transmission flag indicating not distributed, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

46. The apparatus of claim 27, wherein the processor is further configured to determine invalidity of the portion of the payload by detecting an indication for MIMO semi-persistent scheduling.

47. The apparatus of claim 46, wherein the constraint on the portion of the payload further comprises a distributed transmission flag indicating not distributed.

48. The apparatus of claim 46, wherein the constraint on the portion of the payload further comprises a resource allocation allocated less than a pre-defined fraction of bandwidth.

49. The apparatus of claim 46, wherein the constraint on the portion of the payload further comprises a restricted modulation and coding scheme for each of two transport blocks that does not use a highest modulation.

50. The apparatus of claim 46, wherein the constraint on the portion of the payload further comprises a retransmission sequence number indicating a first Hybrid Automatic Repeat-reQuest (HARQ) transmission.

51. The apparatus of claim 46, wherein the constraint on the portion of the payload further comprises a distributed transmission flag indicating not distributed, a resource allocation allocated less than a pre-defined fraction of bandwidth, a restricted modulation and coding scheme for each of two transport blocks that does not use a highest modulation, and a retransmission sequence number indicating a first Hybrid Automatic Repeat-reQuest (HARQ) transmission.

52. The at least one processor of claim 27, wherein the at least one processor is further configured to determine there is a CRC match when a computed CRC value matches an appended CRC value of the payload.

53. A computer program product for receiving a scheduling indication, and for performing multiple error checking not only relying on a validity check field comprising a cyclic redundancy check (CRC), the computer program product comprising:
   a non-transitory computer-readable storage medium comprising,
   a first set of codes for causing a computer to detect a grant or assignment of radio resources in a wireless communication system on a control channel;
   a second set of codes for causing the computer to determine whether a portion of a payload on the control channel satisfies a constraint, the constraint comprising a new data indicator set to a pre-determined value;
   a third set of codes for causing the computer to determine that the grant or assignment is valid if the constraint is satisfied and there is a CRC match;
   a fourth set of codes for causing the computer to determine that the grant or assignment is invalid if the constraint is not satisfied regardless of whether there is a CRC match; and
   a fifth set of codes for causing the computer to transmit or receive in accordance with the payload on the control channel in response to a determination that the grant or assignment is valid.

54. The computer-readable storage medium of claim 53, further comprising a sixth set of codes for causing the computer to determine that there is a CRC match when a computed CRC value matches an appended CRC value of the payload.

55. An apparatus for receiving a scheduling indication and for performing multiple error checking not only relying on a validity check field comprising a cyclic redundancy check (CRC), the apparatus comprising:
   means for detecting a grant or assignment of radio resources in a wireless communication system on a control channel;
   means for determining whether a portion of a payload on the control channel satisfies a constraint, the constraint comprising a new data indicator set to a pre-determined value;
   means for determining that the grant or assignment is valid if the constraint is satisfied and there is a CRC match;
   means for determining that the grant or assignment is invalid if the constraint is not satisfied regardless of whether there is a CRC match; and
   means for transmitting or receiving in accordance with the payload on the control channel in response to a determination that the grant or assignment is valid.

56. The apparatus of claim 55, further comprising means for determining there is a CRC match when a computed CRC value matches an appended CRC value of the payload.

57. An apparatus for receiving a scheduling indication and for performing multiple error checking not only relying on a validity check field comprising a cyclic redundancy check (CRC), the apparatus comprising:
   a receiver for detecting a grant or assignment of radio resources in a wireless communication system on a control channel;
   a computing platform for determining whether a portion of a payload on the control channel satisfies a constraint, the constraint comprising a new data indicator set to a pre-determined value, determining that the grant or assignment is valid if the constraint is satisfied and there is a CRC match, and determining that the grant or assignment is invalid if the constraint is not satisfied regardless of whether there is a CRC match; and
   a transmitter and the receiver for transmitting or receiving in accordance with the payload on the control channel in response to a determination that the grant or assignment is valid.

58. The apparatus of claim 57, further comprising the receiver for detecting a semi-persistent scheduling grant or assignment.

59. The apparatus of claim 57, wherein the constraint on the portion of the payload further comprises an uplink grant flag an aperiodic channel quality indicator set to a pre-defined value, a resource allocation allocated to less than a pre-defined fraction of bandwidth, or a restricted modulation and coding scheme that does not use highest modulations.

60. The apparatus of claim 57, further comprising the receiver for detecting a compact downlink assignment for semi-persistent scheduling.

61. The apparatus of claim 57, wherein the constraint on the portion of the payload further comprises a format indication for compact downlink SPS, a distributed transmission flag set to not indicated, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

62. The apparatus of claim 57, further comprising the receiver for detecting a downlink assignment for single input multiple output (SIMO) semi-persistent scheduling.

63. The apparatus of claim 62, wherein the constraint on the portion of the payload further comprises a distributed transmission flag indicating not distributed, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

64. The apparatus of claim 57, further comprising the receiver for detecting a downlink assignment for multiple input multiple output (MIMO) semi-persistent scheduling.

65. The apparatus of claim 64, further comprising the computing platform for determining invalidity of the portion of the payload by detecting an indication for MIMO semi-persistent scheduling.

66. The apparatus of claim 64, wherein the constraint on the portion of the payload further comprises a distributed transmission flag indicating not distributed, a resource allocation allocated less than a pre-defined fraction of bandwidth, a restricted modulation and coding scheme for each of two transport blocks that does not use a highest modulation, and a retransmission sequence number indicating a first Hybrid Automatic Repeat-reQuest (HARQ) transmission.

67. A method for transmitting a scheduling indication for enabling multiple error checking not only relying on a validity check field comprising a cyclic redundancy check (CRC), the method comprising:
encoding a control channel payload for indicating a grant or assignment of radio resources in a wireless communication system;
computing a CRC value for the control channel payload, wherein the control channel payload comprises the CRC value;
imposing a constraint on a portion of the control channel payload if the grant or assignment is to be validated at a receiver with a CRC match, the constraint comprising a new data indicator set to a pre-defined value, wherein the constraint is not imposed if the grant or assignment is not to be validated at the receiver with the CRC match; and
transmitting the grant or assignment comprising the control channel payload on a control channel.

68. The method of claim 67, wherein the grant or assignment is for semi-persistent scheduling.

69. The method of claim 67, wherein the constraint on the portion of the control channel payload further comprises an uplink grant flag, an aperiodic channel quality indicator set to a pre-defined value, a resource allocation allocated to less than a pre-defined fraction of bandwidth, or a restricted modulation and coding scheme that does not use highest modulations.

70. The method of claim 67, further comprising setting a compact downlink assignment for semi-persistent scheduling.

71. The method of claim 67, wherein the constraint on the portion of the control channel payload further comprises a format indication for compact downlink SPS, a distributed transmission flag set to not indicated, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

72. The method of claim 67, further comprising setting a downlink assignment for single input multiple output (SIMO) semi-persistent scheduling.

73. The method of claim 72, wherein the constraint on the portion of the control channel payload further comprises a distributed transmission flag indicating not distributed, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

74. The method of claim 67, further comprising setting a downlink assignment for multiple input multiple output (MIMO) semi-persistent scheduling.

75. The method of claim 74, wherein the constraint on the portion of the control channel payload further comprises an indication for MIMO semi-persistent scheduling.

76. The method of claim 74, wherein the constraint on the portion of the control channel payload further comprises a distributed transmission flag indicating not distributed, a resource allocation allocated less than a pre-defined fraction of bandwidth, a restricted modulation and coding scheme for each of two transport blocks that does not use a highest modulation, and a retransmission sequence number indicating a first Hybrid Automatic Repeat-reQuest (HARQ) transmission.

77. An apparatus for transmitting a scheduling indication and for performing multiple error checking not only relying on a validity check field comprising a cyclic redundancy check (CRC), the apparatus comprising:
at least one processor configured to:
encode a control channel payload for indicating a grant or assignment of radio resources in a wireless communication system;
compute a CRC value for the control channel payload, wherein the control channel payload comprises the CRC value;
impose a constraint on a portion of the control channel payload if the grant or assignment is to be validated at a receiver with a CRC match, the constraint comprising a new data indicator set to a pre-defined value, wherein the constraint is not imposed if the grant or assignment is not to be validated at the receiver with the CRC match; and
transmit the grant or assignment comprising the control channel payload on a control channel.

78. The apparatus of claim 57, further comprising the computing platform for determining there is a CRC match when a computed CRC value matches an appended CRC value of the payload.

79. A computer program product for transmitting a scheduling indication for enabling multiple error checking not only relying on a validity check field comprising a cyclic redundancy check (CRC), the computer program product comprising:
a non-transitory computer-readable storage medium comprising,
a first set of codes for causing a computer to encode a control channel payload for indicating a grant or assignment of radio resources in a wireless communication system;
a second set of codes for causing the computer to compute a CRC value for the control channel payload, wherein the control channel payload comprises the CRC value;
a third set of codes for causing the computer to impose a constraint on a portion of the control channel payload if the grant or assignment is to be validated at a receiver with a CRC match, the constraint comprising a new data indicator set to a pre-defined value, wherein the constraint is not imposed if the grant or assignment is not to be validated at the receiver with the CRC match; and
a fourth set of codes for causing the computer to transmit the grant or assignment comprising the control channel payload on a control channel.

80. An apparatus for transmitting a scheduling indication and for performing multiple error checking not only relying on a validity check field comprising a cyclic redundancy check (CRC), the apparatus comprising:
means for encoding a control channel payload for indicating a grant or assignment of radio resources in a wireless communication system;
means for computing a CRC value for the control channel payload, wherein the control channel payload comprises the CRC value;
means for imposing a constraint on a portion of the control channel payload if the grant or assignment is to be validated at a receiver with a CRC match, the constraint comprising a new data indicator set to a pre-defined value, wherein the constraint is not imposed if the grant or assignment is not to be validated at the receiver with the CRC match; and
means for transmitting a grant or assignment comprising the control channel payload on a control channel.

81. An apparatus for transmitting a scheduling indication and for performing multiple error checking not only relying on a validity check field comprising a cyclic redundancy check (CRC), the apparatus, comprising:
- a computing platform for encoding a control channel payload for indicating a grant or assignment of radio resources in a wireless communication system;
- the computing platform for computing a CRC value for the control channel payload, wherein the control channel payload comprises the CRC value
- the computing platform for imposing a constraint on a portion of the control channel payload if the grant or assignment is to be validated at a receiver with a CRC match, the constraint comprising a new data indicator set to a pre-defined value, wherein the constraint is not imposed if the grant or assignment is not to be validated at the receiver with the CRC match; and
- a transmitter for transmitting the grant or assignment comprising the control channel payload on a control channel.

82. The apparatus of claim 81, wherein the grant or assignment is for semi-persistent scheduling.

83. The apparatus of claim 81, wherein the constraint on the portion of the control channel payload further comprises an uplink grant flag, an aperiodic channel quality indicator set to a pre-defined value, a resource allocation allocated to less than a pre-defined fraction of bandwidth, or a restricted modulation and coding scheme that does not use highest modulations.

84. The apparatus of claim 81, wherein the constraint on the portion of the control channel payload further comprises a format indication for compact downlink SPS, a distributed transmission flag set to not indicated, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

85. The apparatus of claim 81, further comprising the computing platform for setting a downlink assignment for single input multiple output (SIMO) semi-persistent scheduling.

86. The apparatus of claim 85, wherein the constraint on the portion of the control channel payload further comprises a distributed transmission flag indicating not distributed, a resource allocation allocated less than a pre-defined fraction of bandwidth, a restricted modulation and coding scheme that does not use a highest modulation, and a retransmission sequence number indicating a first Hybrid Automatic Repeat-reQuest (HARQ) transmission.

87. The apparatus of claim 81, further comprising the computing platform for setting a downlink assignment for multiple input multiple output (MIMO) semi-persistent scheduling.

88. The apparatus of claim 87, wherein the constraint on the portion of the control channel payload further comprises an indication for MIMO semi-persistent scheduling.

89. The apparatus of claim 87, wherein the constraint on the portion of the control channel payload further comprises a distributed transmission flag indicating not distributed, a resource allocation allocated less than a pre-defined fraction of bandwidth, a restricted modulation and coding scheme for each of two transport blocks that does not use a highest modulation, and a retransmission sequence number indicating a first Hybrid Automatic Repeat-reQuest (HARQ) transmission.

* * * * *